Oct. 25, 1927.
J. W. HOOLEY
1,647,002
ELECTRIC APPLIANCE SUPPORT AND CONNECTION
Filed Feb. 12, 1926
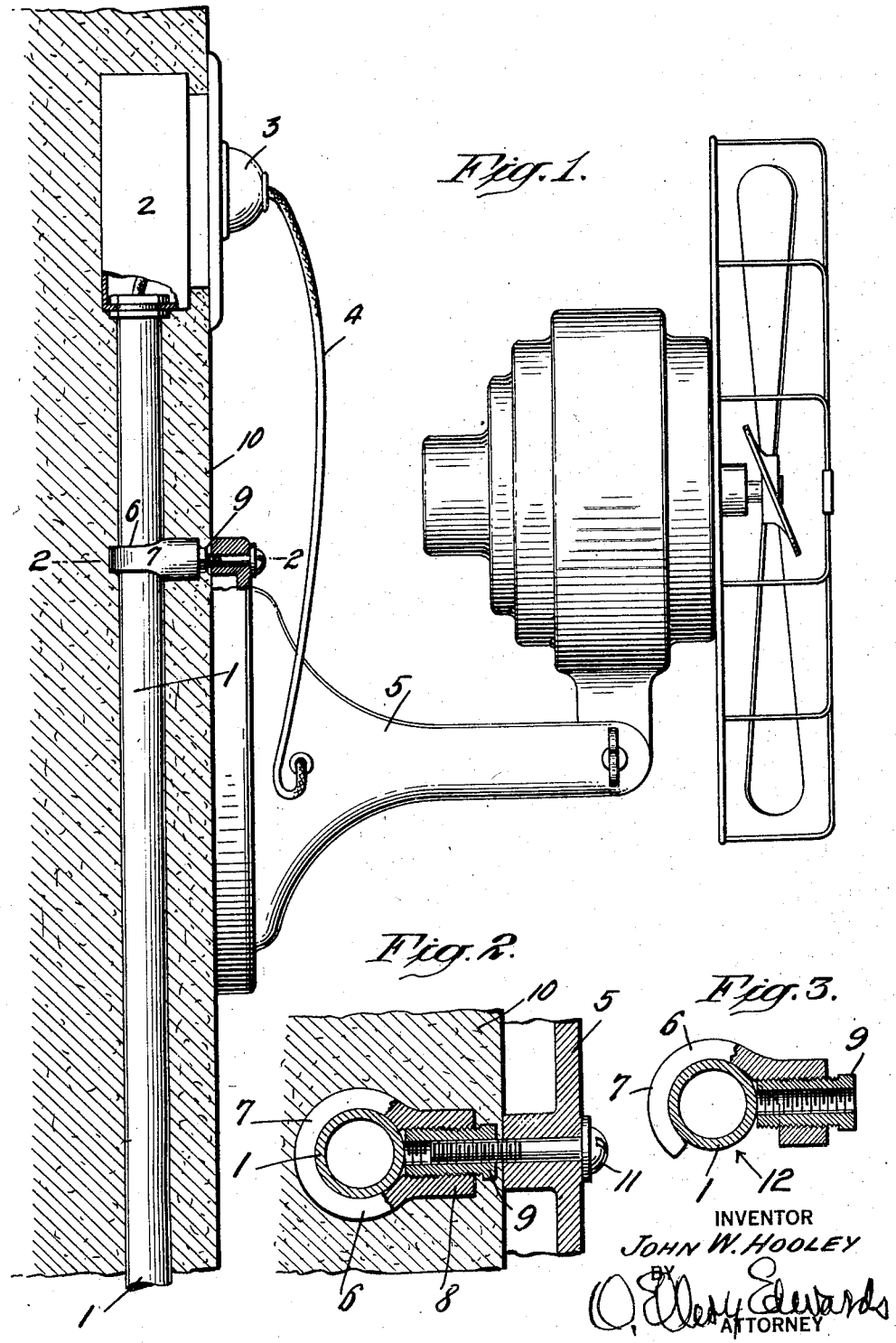
INVENTOR
JOHN W. HOOLEY
BY
ATTORNEY Patented Oct. 25, 1927.

1,647,002

UNITED STATES PATENT OFFICE.

JOHN W. HOOLEY, OF LARCHMONT, NEW YORK.

ELECTRIC APPLIANCE SUPPORT AND CONNECTION.

Application filed February 12, 1926. Serial No. 87,793.

The invention relates to means for supporting electric appliances such as fans in convenient positions of utility, and the object of the invention is to provide such supports without requiring the employment of desks or tables or any equivalent thereof, or the employment of connecting cords of the length usually employed and which are often in the way of persons moving about an office or apartment and sometimes cause displacement of an appliance from a desk or table.

With the above object in view, the invention consists in the construction and combination of parts substantially as hereinafter described and claimed.

Of the accompanying drawings:

Figure 1 is a sectional view showing my improved means in use.

Figure 2 represents a section on line 2—2 of Figure 1, on a larger scale.

Figure 3 illustrates a modification hereinafter described.

Similar reference characters designate similar parts in all of the views.

In the particular embodiment of the invention illustrated, a conduit 1 runs to a junction box 2 in which is mounted a plug 3 in the conventional manner, said plug being at one end of a short cord 4, the other end of which cord runs to the base 5 of a fan or any other suitable electrical appliance and supplies the same with power. On the tube or conduit 1 is mounted a screw anchor 6 which has a loop portion 7 extending about the conduit, and a boss 8 projecting laterally, said boss being provided with a hole which is screw threaded so as to receive a hollow set screw 9 which also is screw threaded in its interior as well as on its exterior.

The set screw 9 may be tightened or loosened, in the conventional manner, so as to hold the screw anchor 6 firmly in place at any desired location along the conduit 1. When in place plaster 10, or other material, may be applied in the conventional manner.

After the plaster is in place, a fan or other electrical appliance may be mounted in place by means of a screw 11 (Fig. 3) passing through a hole in the base 5 and into the interior of the set screw 9.

The structure illustrated by Figure 3 is for use when the plaster has been applied before a screw anchor is affixed to the conduit 1. In this structure, the anchor member is hook-shaped with a side opening 12 the width of which is sufficient to enable said member to be engaged with the conduit by a lateral movement of the said member relatively to the conduit, the set screw 9 being then operated to cause the hook-shaped portion to be gripped against the rear of the conduit. This structure enables screw anchors to be applied and affixed to conduits which have been previously embedded in wall structures.

While it is to be understood that electrical appliances other than fans may be supported in the manner illustrated and described, the invention is particularly useful for supporting fans in positions of utility where they will never have to be shifted about to make room for other articles on a desk, table, or elsewhere. It is, of course, preferable, that the conduits and junction boxes which are employed shall be in the walls of the offices or apartments, because the mounting of the fan and the insertion of the plug 3 will then be in easily accessible positions. And the fan will be in a convenient position, close to a wall, and the cord 4, which need not be long, will never traverse a portion of a room where it will be in way of anyone. The weight of the fan and its motor holds its base against the surface of the wall, with the fan itself firmly held for steady operation in a place from which it is never liable to be accidentally displaced.

The term junction box is employed herein for purposes of explanation and not limitation. It is intended to include any structure of outlet box which permits external wiring to lead from the conduit to a fan or other electrical appliance. Any means for connecting the cord 4 with the wires in the conduit may be employed without departing from my invention the important feature of which is that the fan or appliance is firmly supported in a convenient location with no connecting wiring stretching across a room to a desk or equivalent support.

Having now described my invention, I claim:—

1. The combination with an electric wire conduit embedded in a wall, of an anchor member having a portion engaging the rear of the conduit and an interiorly threaded portion projecting toward the surface of the wall, and means coacting with said interiorly threaded portions for supporting an appliance at the surface of the wall.

2. The combination with an electric wire conduit embedded in a wall, of an anchor member having an opening to enable it to be applied to the conduit with a portion engaging the rear of the conduit, said anchor member having a radially projecting interiorly threaded portion, a set screw cooperating with said interiorly threaded portion to bind the anchor member to the conduit, and a member coacting with said set screw to hold an appliance adjacent to the wall.

3. A screw anchor having a part to embrace a conduit and another part adapted to receive a set screw, a hollow set screw secured in said last mentioned part for fixing the screw anchor in place, said set screw having interior screw threads, and a supporting member engaged with said interior screw threads and adapted to support an object.

In testimony whereof, I have hereunto set my hand this 6th day of February, 1926.

JOHN W. HOOLEY.